R. J. A. WEIR.
COMBINATION POLICY AND REPORT BLANK.
APPLICATION FILED SEPT. 4, 1917.

1,279,189.

Patented Sept. 17, 1918.

WITNESS:

INVENTOR.
Robert J. A. Weir.
BY
Strong & Townsend
ATTORNEYS.

UNITED STATES PATENT OFFICE.

ROBERT J. A. WEIR, OF SAN FRANCISCO, CALIFORNIA, ASSIGNOR TO JOHN KITCHEN JR. COMPANY, OF SAN FRANCISCO, CALIFORNIA, A CORPORATION OF CALIFORNIA, DOING BUSINESS UNDER THE NAME OF PRIMO PRESS.

COMBINATION POLICY AND REPORT BLANK.

1,279,189.  Specification of Letters Patent.  Patented Sept. 17, 1918.

Application filed September 4, 1917.  Serial No. 189,516.

*To all whom it may concern:*

Be it known that I, ROBERT J. A. WEIR, a citizen of the United States, residing at the city and county of San Francisco and State of California, have invented new and useful Improvements in Combination Policy and Report Blanks, of which the following is a specification.

This invention relates to policy blanks and reports used in writing insurance and so forth, and has for its object to reduce the time and labor required to fill in the policy and the agent's report thereof.

The usual practice in writing insurance is to fill in a policy to be delivered to the insured and in connection with the same transaction to make duplicate reports, one for the company and the other for the agent containing data similar to that appearing on the policy. As the business is ordinarily conducted, these reports are filled out separately from the policy and require considerable time and labor, much of which is in the nature of duplicate work already done in filling out the policy. By the present invention I provide a novel combination of forms which permits the filling in of all three instruments or at least so much of them as is similar or alike at one and the same time.

One form which my invention may assume is exemplified in the following description and illustrated in the accompanying drawings, in which—

Figure 1 shows a plan view of the front sheet of the policy which is in folio.

Fig. 2 shows a plan of the duplicate reports spread out, the two being connected along a perforated line at their upper ends and normally folded one over the other.

Fig. 3 shows a sectional view of the three forms in assembled position with carbon paper in place to imprint the entries of the policy upon the reports.

The policy itself is shown as consisting of a sheet 10 folded along a median line at the upper edge of the front page. The front page is shown in the form of a fire insurance policy blank containing in addition to the usual printed matter, such as the company's name, introductory phraseology, etc., blank spaces 11 at the upper right-hand corner for the amount, rate and premium in figures, and blank spaces 12 in the body of the instrument for the amount of the premium in words, name of the insured, commencement of term, expiration of term and amount of insurance in words. Beneath the last mentioned blanks is a large space 13 for a description of the property insured. The policy concludes with the usual stereotyped covenants following which are blank spaces 14 for the signature of the agent or insurer and the date of execution. The remaining pages of the policy contain terms, conditions, indorsements, etc., the specific nature of which varies with different policies and is not necessary to illustrate in connection with the present invention.

Within the folded sheets of the policy are the agent's original and duplicate reports 15 and 16 respectively, consisting of a single sheet folded on a perforated line 17 which constitutes the top of the front pages. These reports are fastened temporarily in place between the folds of the policy by means of spots of adhesive material 18 or other suitable means not liable to injure the paper in removing the same. The reports are of less length than the pages of the policy and their lower edges terminate preferably on a line somewhere above the blank spaces 14 of the policy.

The reports are more or less informal and yet for the most part contain the same data as appears on the front page of the policy, with some additional information not found on the latter. The upper right-hand corner of the front page of each report has blank spaces 19 for the amount, rate and premium of the insurance in figures corresponding in position to the spaces 11 on the policy. There are also spaces 20 for the amount of the premium in words, name of insured, term of insurance, including date of commencement and expiration, and the amount of the insurance in words, all similar and corresponding in position to the blank spaces 12 on the policy. Beneath the last mentioned spaces and corresponding to the space 13 on the policy is a similar blank space 21 on the reports for a description of the property. All of the above-named blank spaces, being in register with corresponding spaces on the front page of the policy, can therefore be filled out at the same time that the policy is written by means of carbon papers 22 placed in proper position, as shown in Fig. 3. A typewriter, indelible pencil or any other instrument which will cause the carbon to transfer the impressions can be used for this purpose.

The policy is preferably filled in in its entirety before removing the reports, and by reason of the short length of the reports, the signature of the insurer and date of execution of the policy appearing in the blank spaces 14 at the bottom of the front page of the policy will not be transferred to the reports. When the policy is completely filled in the reports are removed therefrom and completed on their front pages with whatever additional information is required, such as, name of the agent or agency and number and amounts of other policies issued on the same risk. Then the reports are reversed, that is, turned over to expose the back side of one, without separating them. Carbon paper is placed in position between them and the reverse side filled in with technical and confidential information, the specific nature of which varies in different forms. The reverse sides having been completed, the reports are separated along the perforated line and one sent to the company and the other retained by the agent for his own records.

The reverse face of 16 shown in Fig. 2 is provided with a printed form similar to the form shown on the obverse face of 15, and the reverse face of 15, Fig. 2, is provided with delineated spaces and columns like the columns and spaces shown on the obverse face of 16.

By the present arrangement of forms the reports are made to correspond on their front sides with the front of the policy, and being positioned in place beneath, are always properly disposed to receive a transfer of the impressions made on the carbon papers in filling in the policy. Also the two reports being fastened together are kept in register after being removed from the policy, and the completion of the front pages of the reports after removal will not be interfered with. Furthermore, the reports can be reversed to receive data on the reverse sides without danger of getting out of register. As no duplication of work whatever is necessary in filling in the various forms an appreciable amount of time and labor is saved to the insurance writer. This is of great advantage to busy agents who very often are required to fill in policies and report hastily or under conditions such as are encountered in the field where convenient facilities for writing are not at hand.

Having thus described my invention, what I claim and desire to secure by Letters Patent is:

1. As a new article of manufacture, a combination policy and report blank for insurance composed of a policy sheet folded to have two sections, a duplicate report sheet folded to have two sections, of less length than those of the policy sheet, the free ends of the sections of the policy sheet having suitably indicated spaces to receive data, the front faces of the sections of the report sheet having suitably indicated spaces to receive data placed on the front section of the policy sheet, and the rear faces of the sections of the report sheet having suitably indicated spaces to receive data different from that placed on the front face of the front section of the policy sheet, and means to removably secure the report sheet between the sections of the policy sheet with the free ends of the latter extending beyond the free ends of the sections of the report sheet so that the data placed upon the said indicated spaces at the free ends of the policy sheet will not be transferred to the report sheet, said report sheet upon removal being reversible to receive a carbon sheet between its sections so as to receive data on the rear faces of its sections other than data appearing on the policy sheet.

2. As a new article of manufacture, a combination policy and report blank for insurance composed of a policy sheet folded to have two sections, a duplicate report sheet folded to have two sections, the front faces of the sections of the report sheet having suitably indicated spaces to receive data placed on the front section of the policy sheet, and the rear faces of the sections of the report sheet having suitably indicated spaces to receive data different from that placed on the policy sheet, and means to removably secure the report sheet between the sections of the policy sheet whereby upon such removal the sections of the report sheet may be reversed to receive a carbon sheet therebetween so as to receive data on the rear faces of said report sheet sections different from the data placed on the policy sheet.

In testimony whereof I have hereunto set my hand in the presence of two subscribing witnesses.

ROBERT J. A. WEIR.

Witnesses:
JOHN KITCHEN, Jr.,
GEO. F. WINTERBURN.